US008213207B2

(12) United States Patent  
Kallay et al.

(10) Patent No.: US 8,213,207 B2  
(45) Date of Patent: Jul. 3, 2012

(54) PRINTED BOARD ASSEMBLY MOVEMENT DETECTION

(75) Inventors: Richard Kallay, Largo, FL (US); William J. Dalzell, Parrish, FL (US); Joseph C. Hart, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 133 days.

(21) Appl. No.: 12/868,372

(22) Filed: Aug. 25, 2010

(65) Prior Publication Data

US 2012/0051111 A1 Mar. 1, 2012

(51) Int. Cl.  
*G11C 5/02* (2006.01)  
*G11C 11/00* (2006.01)  
*H01H 47/00* (2006.01)

(52) U.S. Cl. .......... 365/51; 365/158; 361/142; 361/143; 361/600

(58) Field of Classification Search .................... 365/51, 365/158; 361/142, 143, 600  
See application file for complete search history.

(56) References Cited

U.S. PATENT DOCUMENTS

| | | | |
|---|---|---|---|
| 5,053,992 A | 10/1991 | Gilberg et al. | |
| 6,292,898 B1 | 9/2001 | Sutherland | |
| 7,005,733 B2 | 2/2006 | Kommerling et al. | |
| 7,519,763 B2 | 4/2009 | McLean | |
| 7,685,438 B2 | 3/2010 | Knudsen | |
| 7,712,147 B2 | 5/2010 | Lenssen et al. | |

*Primary Examiner* — Ly D Pham  
(74) *Attorney, Agent, or Firm* — Shumaker & Sieffert, P.A.

(57) ABSTRACT

A system may include a first connector housing, a magnetic data storage device mechanically coupled to the first connector housing, a second connector housing configured to be mechanically engaged with the first connector housing, and a permanent magnet mechanically coupled to the second cavity. In some examples, relative motion between the magnetic data storage device and the permanent magnetic causes data stored on the magnetic data storage device to be modified. In one example, the system further includes a printed board assembly mechanically coupled to one of the first or second connector housings and a master interconnect board mechanically coupled to the other one of the first or connector housings. Modification to the data stored on the magnetic data storage device may indicate relative movement between the first and second connector housings.

20 Claims, 5 Drawing Sheets

PRINTED BOARD ASSEMBLY MOVEMENT DETECTION

TECHNICAL FIELD

The disclosure relates to mechanisms for detection of printed board assembly removal.

BACKGROUND

Printed board assemblies (PBAs) include a printed board (PB) and components coupled to the PB. In some cases, the components include at least one integrated circuit, along with memory chips that store instructions that the integrated circuit executes and/or other data. The instructions and/or data may be proprietary to the manufacturer of the PBA or the purchaser of the PBA.

SUMMARY

In general, the disclosure is directed to detection of PBA movement relative to a device to which the PBA is mechanically coupled, such as, for example, a master interconnect board (MIB). In some examples, the movement may include disengagement of a first connector mechanically coupled to the PBA and a second connector mechanically coupled to the MIB. In some examples, a mechanism that helps detect the PBA movement includes a permanent magnet substantially fully enclosed in a housing of a first connector and a magnetic data storage device substantially fully enclosed in a housing of a second connector. The magnetic data storage device may in some examples be a magnetic random access memory (MRAM) device. In some examples, the first and second connector housings may be configured to be mechanically and/or electrically engaged with each other in a removable manner.

In some examples, the system for detection of PBA movement may determine whether the magnetic data storage device has been moved relative to the permanent magnet, which may indicate mechanical disengagement of the first and second connectors, by examining data stored by the magnetic data storage device. For example, a technique may include mechanically engaging the first connector housing and the second connector housing, which may bring the permanent magnet and the magnetic data storage device in relatively close proximity to each other. As used herein, the term "relatively close proximity" may refer to a distance at which the magnetic field generated by the permanent magnet is sufficient to effect modification of the data stored in the magnetic data storage device when the magnetic data storage device is moved within the magnetic field. Once the first and second connector housings have been mechanically engaged and the permanent magnet and the magnetic data storage device are in relatively close proximity to each other, data may be written to the magnetic data storage device. In some examples, the data may include a random or pseudo-random number.

The second connector housing, which may substantially enclose the magnetic data storage device, may be directly or indirectly electrically coupled to an integrated circuit. The integrated circuit may be configured to execute instructions stored in memory that cause the integrated circuit to retrieve the data stored on the magnetic data storage device and evaluate the data to determine whether the data indicates that the magnetic data storage device has been moved relative to the permanent magnet. By determining whether the data stored on the magnetic data storage device is the same as the originally written data, the integrated circuit may determine whether the magnetic data storage device has been moved relative to the permanent magnet. For example, when the magnetic data storage device has been moved relative to the permanent magnet, the movement of the magnetic data storage device through the magnetic field generated by the permanent magnet may cause changes to the data stored on the magnetic data storage device. In this way, by determining whether the data stored on the magnetic data storage device is the same as the originally written data or has been modified, the integrated circuit may determine whether the magnetic data storage device has been moved relative to the permanent magnet.

In one aspect, the disclosure is directed to a system that includes a first connector housing, a magnetic data storage device mechanically coupled to the first cavity, a second connector housing configured to be mechanically engaged with the first connector housing, and a permanent magnet mechanically coupled to the second cavity. According to this aspect of the disclosure, relative motion between the magnetic data storage device and the permanent magnetic causes data stored on the magnetic data storage device to be modified.

In another aspect, the disclosure is directed to a method that includes mechanically engaging a first connector housing and a second connector housing, where mechanically engaging the first connector housing and the second connector housing brings a magnetic data storage device mechanically coupled to the first connector housing within a magnetic field generated by a permanent magnetic mechanically coupled to the second connector housing. According to this aspect of the disclosure, the method further includes generating a random or pseudo-random number and storing the random or pseudo-random number to the magnetic data storage device while the magnetic data storage device is within the magnetic field.

In a further aspect, the disclosure is directed to a method that includes retrieving data with an integrated circuit from a magnetic data storage device mechanically coupled to a first connector housing and determining, with the integrated circuit and based on the data, whether the magnetic data storage device has been moved relative to a magnetic field generated by a permanent magnet mechanically coupled to a second connector housing after the data was written to the magnetic data storage device.

The details of one or more examples of the disclosure are set forth in the accompanying drawings and the description below. Other features, objects, and advantages will be apparent from the description and drawings, and from the claims.

DETAILED DESCRIPTION

Devices, systems, and methods for detection of PBA tampering are described herein. Tampering with a PBA may be undesirable in some cases, such as cases in which the PBA includes memory that stores data that is proprietary to a manufacturer of the PBA or a purchaser of the PBA. In some examples, a system with a PBA mechanically engaged with a master interconnect board (MIB) includes a magnetic data storage device and a permanent magnet. For example, either the magnetic data storage device or the permanent magnet may be mechanically coupled to the PBA and the other one of the magnetic data storage device or the permanent magnet may be mechanically coupled to the MIB. Attempted disconnection of the PBA from the MIB may cause relative movement between the magnetic data storage device and permanent magnet, which may itself cause data stored on the magnetic data storage device to be modified. The modification to the data stored on the magnetic data storage device may indicate the PBA has been tampered with, e.g., the PBA has been moved relative to the MIB.

Figure 1:
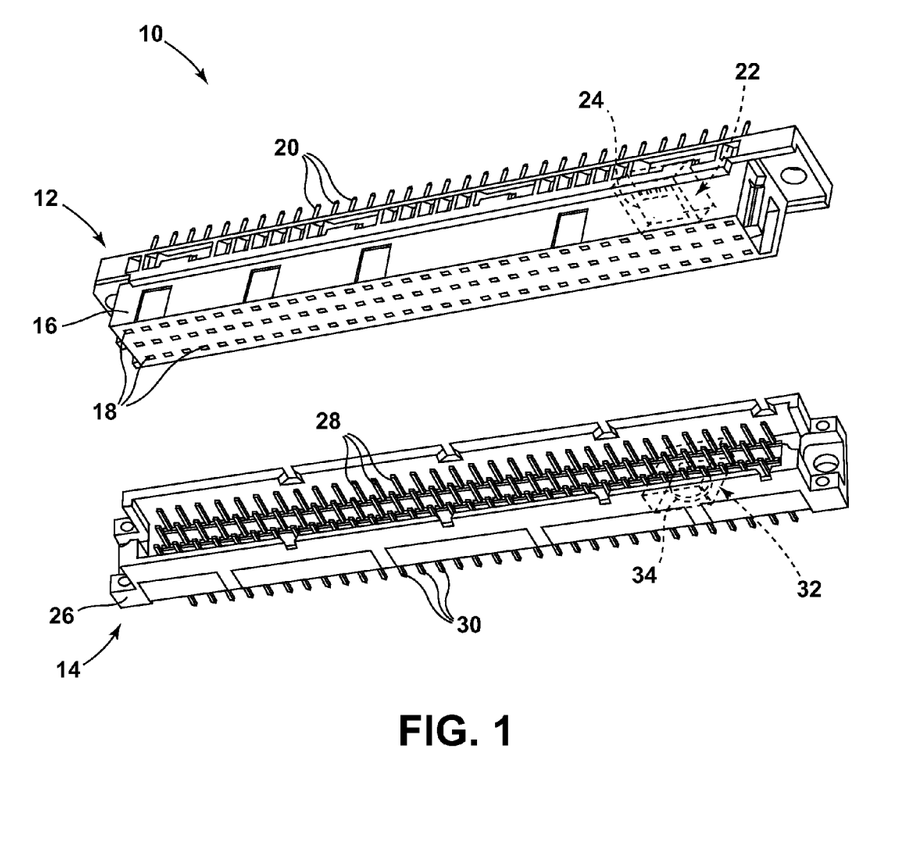
FIG. 1 is a conceptual diagram that illustrates an example of a first connector housing and a second connector housing.

FIG. 1 is a conceptual diagram that illustrates an example of a system 10 that includes first connector 12 and a second connector 14. First connector 12 includes a first connector housing 16, which defines a plurality of female electrical receptacles 18 each connected to a respective one of a plurality of electrical contacts 20. Magnetic data storage device 24 is mechanically coupled to first connector housing 16. In the example shown in FIG. 1, first connector housing 16 also defines a first cavity 22, in which magnetic data storage device 24 may be disposed. In some examples, magnetic data storage device 24 is substantially fully enclosed within first cavity 22. Other suitable techniques for mechanically coupling magnetic data storage device 24 to first connector housing 16 may be used in addition to or instead of disposing magnetic data storage device 24 in a cavity defined by first connector housing 16. For example, magnetic data storage device 24 may be adhered to, soldered or brazed to, mechanically fastened to, press-fit into, or otherwise secured to first connector housing 16.

In the illustrated example, system 10 also includes second connector 14, which may include a second connector housing 26 and a plurality of male electrical contacts 28, which are configured to engage with female electrical receptacles 18 and electrically couple to the plurality of electrical contacts 20 of first connector 12. Second connector also include a plurality of electrical contacts 30, which are each connected to a respective one of male electrical contacts 28. Permanent magnet 34 is mechanically coupled to second connector housing 26. In the example shown in FIG. 1, second connector housing 26 defines a second cavity 32, in which a permanent magnet 34 may be disposed. In some examples, permanent magnet 34 is substantially fully enclosed within second cavity 32. Other suitable techniques for mechanically coupling permanent magnet 34 to second connector housing 26 may be used in addition to or instead of disposing permanent magnet 34 in a cavity defined by first connector housing 16. For example, permanent magnet 34 may be adhered to, welded to, soldered to, brazed to, press-fit into, or otherwise secured to second connector housing 26.

Figure 2:
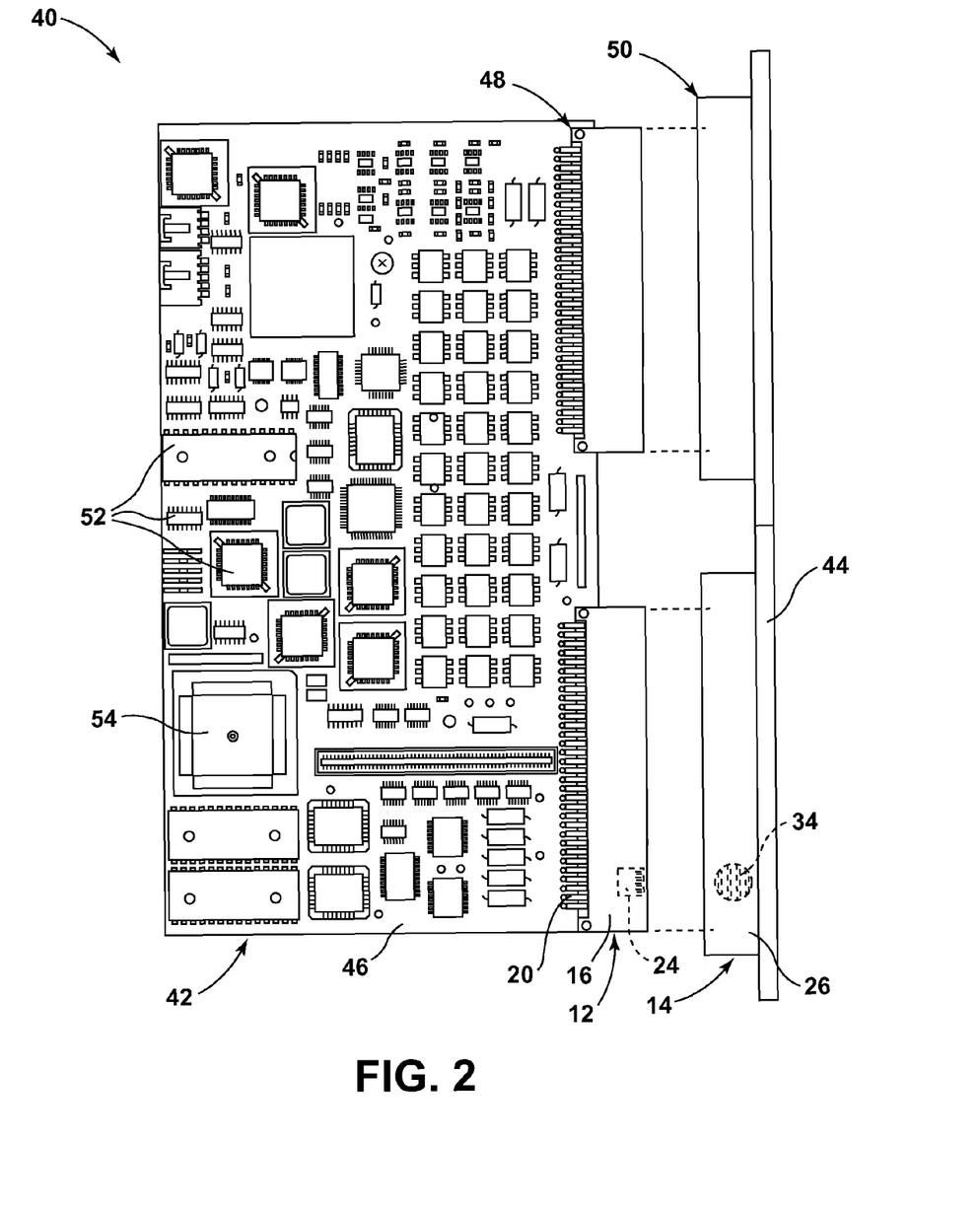
FIG. 2 is a conceptual diagram that illustrates an example of a first connector housing mechanically coupled to a printed board assembly and a second connector housing mechanically coupled to a master interconnect board.
Figure 3:
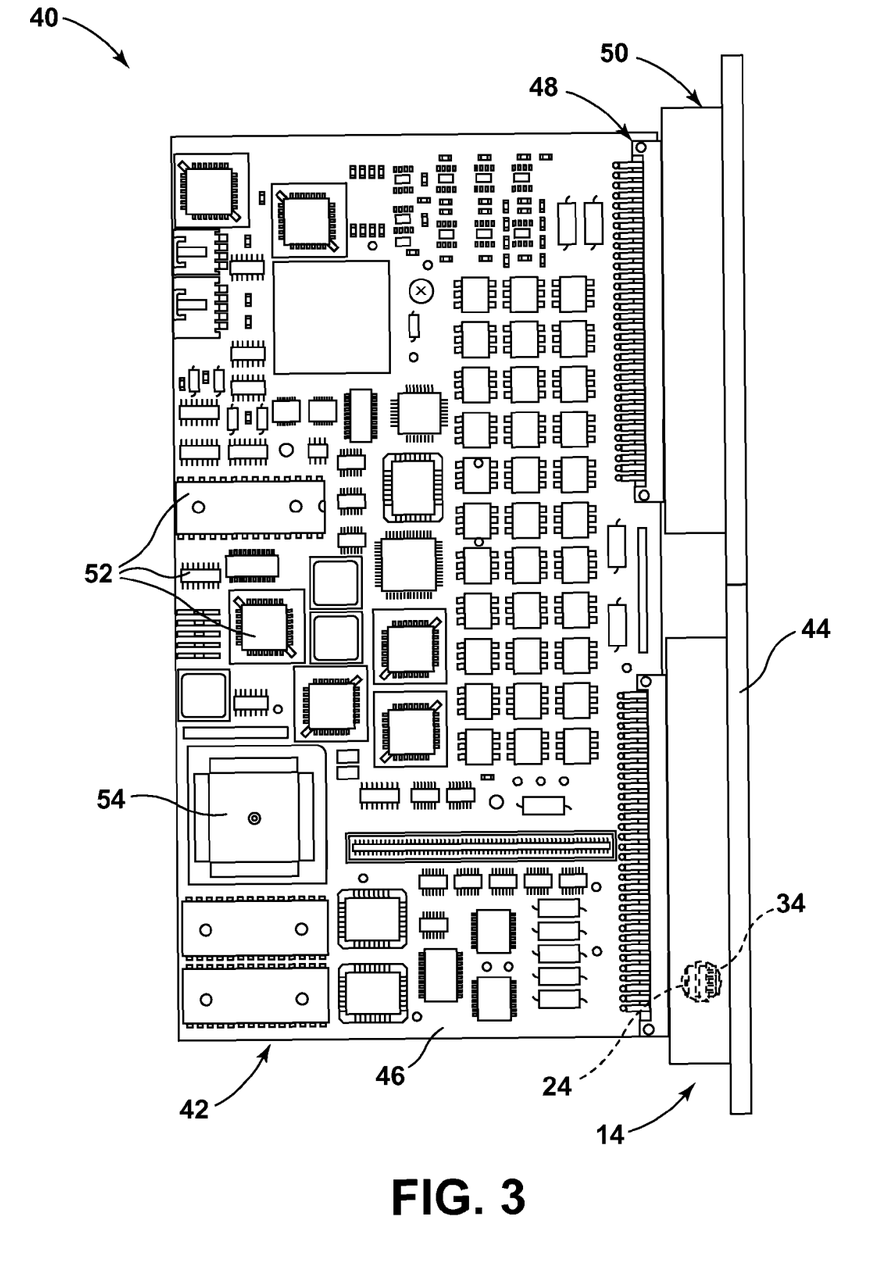
FIG. 3 is a conceptual diagram that illustrates an example of a first connector housing mechanically coupled to a printed board assembly and a second connector housing mechanically coupled to a master interconnect board, where the first connector housing is releasably coupled to the second connector housing.

Together, first connector 12 and second connector 14 may be used to make mechanical and electrical connections between two devices. In some examples, the first device may be permanently connected to first connector 12 and the second device may be permanently connected to second connector 14. In some examples, permanent connection may indicate a connection between two objects where the objects cannot be disconnected without substantially physically damaging at least one of the objects or adversely affecting the performance of at least one of the objects. An example of two devices that may be connected using first connector 12 and second connector 14 includes a printed board assembly (PBA) and a master interconnect board (MIB), as illustrated in FIGS. 2 and 3, discussed below.

First connector 12 and second connector 14 may include any one of a variety of connector types, such as, for example, a VMEbus (VERSAmodule Eurocard) connector (defined by IEEE Standard 1014), a VME64 bus connector (defined by ANSI/VITA Standard 1-1994), an Arinc 404 connector, or the like. The particular choice of connector may depend upon, for example, the desired mechanical and electrical properties of the connector housing and the electrical connections carried by the connector housing, such as, for example, the quality and reliability of the mechanical and electrical connection between the first and second connectors, the signal bandwidth, type, signal-to-noise ratio, number of signal channels, or the like.

In some implementations, first connector 12 and second connector 14 may include respective housings that facilitate substantially full encapsulation of magnetic data storage device 24 and permanent magnet 34, respectively. Substantially full encapsulation of magnetic data storage device 24 and permanent magnet 34 may provide an additional layer of security against tampering with a PBA or another system including connectors 12, 14 by at least partially concealing magnetic data storage device 24 and/or permanent magnet 34 from visual inspection. At least partial concealment of magnetic data storage device 24 and/or permanent magnet 34 may lower a likelihood that an unauthorized user could detect magnetic data storage device 24 and/or permanent magnet 34 and attempt to circumvent the functionality of permanent magnet 34 and magnetic data storage device 24.

To accomplish substantially full enclosure of magnetic data storage device 24, first connector housing 16 may define first cavity 22 in which magnetic data storage device 24 is disposed. First cavity 22 may be defined in first connector housing 16 during the manufacturing of first connector housing 16, such as during a molding, extruding, or other method of forming first connector housing 16. Similarly, second connector housing 26 may define second cavity 32 in which permanent magnet 32 is disposed. Second cavity 32 also may be defined in second connector housing 26 during the manufacturing second connector housing 26. Other techniques for defining cavities 22, 32 are contemplated, such as etching the material of housings 16, 26, respectively. In addition, in other examples, magnetic data storage device 24 and permanent magnet 34 may be mechanically coupled to the respective connectors 12, 14 using any suitable technique, which may not include the enclosure of the magnetic data storage device 24 and permanent magnet 34 in cavities.

As shown in FIG. 1, in some examples, first cavity 22 of first connector 12 may occupy space that in an unmodified connector would be occupied by female electrical receptacles 18 or another portion of first connector 12. Similarly, second cavity 32 of second connector 14 may occupy space that in an unmodified connector would be occupied by electrical connections between male electrical contacts 28 and electrical contacts 30 of second connector 14.

In some examples, even when first cavity 22 occupies interior space of first connector housing 16, exterior dimensions and features of first connector housing 16 may substantially conform to dimensions and features defined by the connector standard (e.g., a VMEbus connector standard or the like). In other words, the exterior of first connector housing 16 may be substantially indistinguishable from an unmodified connector housing. For example, first connector housing 16 may include a standard number of female electrical receptacles 18 and a standard number of electrical contacts 20 (e.g., the number of receptacles 18 and contacts 20 defined by the connector standard). In some examples, at least some of the female electrical receptacles 18 may not be electrically connected to respective ones of at least some of the electrical contacts 20, for example, where first cavity 22 is located, but may instead be dummy female electrical receptacles. Additionally or alternatively, at least some of electrical contact 20 may be electrically connected to magnetic data storage device 24 instead of to female electrical receptacles 18. In this way, at least one of electrical contacts 20 may provide an input and output path for electrical signals to be transmitted to and from magnetic data storage device 24.

Similarly, exterior dimensions and features of second connector housing 26 may substantially conform to the connector standard (e.g., a VMEbus connector standard or the like), even when second connector housing 26 defines second cavity 32. In such examples, second connector 14 may include a standard number of male electrical contacts 28 (e.g., the number of electrical contacts 28 defined by the connector standard). In some implementations, at least one of male electrical contacts 28 may not connect to a corresponding one of electrical contacts 30, for example, where electrical connections between contacts 28 and contacts 30 in an unmodified connector would pass through the volume occupied by second cavity 32, but may instead be dummy male electrical contacts.

In some examples, the locations of first cavity 22 within first connector housing 16 and second cavity 32 within second connector housing 26 may be selected based on various considerations. In some cases, the locations of cavities 22, 32 may be selected based on the type of signals conducted by the respective male electrical contacts 28 and female electrical receptacles 18. For example, signals such as power signals or some digital signals may be less sensitive to electrical noise that may be generated due to permanent magnet 34, or electrical noise present in power signals or some digital signals may be less of a concern than electrical noise present in some other signals. Similarly, male electrical contacts 28 and corresponding female electrical receptacles 18 that are connected to ground may be less sensitive to electrical noise. Conversely, high speed analog or digital signals may be more sensitive to electrical noise. Accordingly, in some examples, first cavity 22 and second cavity 32 may be formed in first connector housing 16 and second connector housing 26, respectively, in locations proximate to male electrical contacts 28 and female electrical receptacles 18 that are selected to carry signals that are less sensitive to electrical noise and relatively distant from male electrical contacts 28 and female electrical receptacles 18 that are selected to carry signals that are more sensitive to electrical noise.

Additionally or alternatively, permanent magnet 34 may be at least partially magnetically shielded to reduce or substantially eliminate electrical noise generated by the presence of permanent magnet 34 from interfering with signals conducted by male electrical contacts 28 and female electrical receptacles 18. In some examples, the magnetic shield may include a Faraday cage. Permanent magnet 34 may be shielded in a manner that allows the magnetic field generated by permanent magnet 34 to affect magnetic data storage device 24 while mitigating effects of the magnetic field on signals conducted by male electrical contacts 28 and female electrical receptacles 18.

As described above, in some examples, first connector 12 and second connector 14 may be mechanically and electrically connected to respective devices. FIGS. 2 and 3 are conceptual diagrams that illustrate one example of first connector 12 and second connector 14 connected to respective devices. In the example illustrated in FIGS. 2 and 3, first connector 12 is mechanically and electrically coupled to PB 46, which forms part of PBA 42, along with electronic components 52 and integrated circuit 54. In FIGS. 2 and 3, second connector 14 is mechanically and electrically coupled to a master interconnect board (MIB) 44. First connector 12 may be substantially permanently (e.g., cannot be removed without substantially physically damaging at least one of PB 46 or first connector 12 or adversely affecting the performance of PB 46 or first connector 12) connected to PB 46 via, for example, soldering electrical contacts 20 to conductive pads on PB 46. In some examples, first connector 12 may additionally or alternatively be mechanically connected to PB 46 using adhesive, friction-fit clips, or another suitable mechanical securing mechanism. Second connector 14 may be connected to MIB 44 in a similar manner.

In the example illustrated in FIGS. 2 and 3, a third connector 48 is mechanically and electrically coupled to PB 46 and a fourth connector 50 is mechanically and electrically coupled to MIB 44. Third connector 48 is configured to mechanically and electrically engage with fourth connector 50 to removably connect PBA 42 and MIB 44, in combination with first connector 12 and second connector 14. In some examples, as illustrated in FIGS. 2 and 3, third connector 48 and fourth connector 50 may not include a magnetic data storage device and a permanent magnet, respectively. However, in other examples, third connector 48 may house a magnetic data storage device and fourth connector 50 may house a permanent magnet, similar to first connector 12 and second connector 14, respectively.

Although FIGS. 2 and 3 illustrate first connector 12 and third connector 48 as mechanically and electrically connected to PB 46 and second connector 14 and fourth connector 50 as mechanically and electrically connected to MIB 44, in other examples, a system may include more or fewer connectors. For example, a system may include first connector 12 mechanically and electrically connected to PB 46 and second connector 14 mechanically and electrically connected to MIB 44, and no other connectors between PB 46 and MIB 44. In other examples, a system may include three or more connectors mechanically and electrically connected to PB and a corresponding number of connectors mechanically and electrically connected to MIB 44.

PB 46 is a substrate that is configured to provide mechanical support to and electrical connections among various electronic components 52 attached to PB 46. Together, PB 46, electronic components 52, and integrated circuit 54 define a PBA 42 in the example shown in FIG. 2. In other examples, PBA 42 may include a fewer or a greater number of components (e.g., electrical components) or integrated circuits, and may have any suitable configuration. Generally, PB 46 may include a non-conductive substrate and electrical traces formed on an exterior surface of the non-conductive substrate. In some examples, PB 46 may be a multi-layer board, which includes multiple relatively thin non-conductive substrates with electrical traces formed on the surfaces of the substrates. The multiple, relatively thin non-conductive substrates may then be bonded together to form a multi-layer board that includes electrical trace layers in a plurality of substantially parallel planes within PB 46.

Electronic components 52 may include, for example, capacitors, inductors, resistors, batteries, integrated circuits, or the like. The integrated circuits may include, for example, memory, such as random access memory (RAM) or the like, general purpose processors, application specific integrated circuits (ASICs), field programmable gate arrays (FPGAs), digital signal processors (DSPs). One example of an electronic component 52 is integrated circuit 54, which may include a processor, ASIC, FPGA, DSP, alone or in combination with memory.

Integrated circuit 54 may be electrically coupled to magnetic data storage device 24 via at least one electrical trace on PB 46. Integrated circuit 54 may transmit commands to and receive data from magnetic data storage device 24 via the at least one electrical trace.

FIG. 2 illustrates PBA 42 disconnected from MIB 44. More particularly, first connector 12 is both mechanically and electrically disengaged from second connector 14 and third connector 48 is mechanically and electrically disengaged from fourth connector 50. FIG. 3 illustrates PBA 42 mechanically and electrically connected to MIB 44. In this example, first connector 12 is removably engaged with second connector 14 and third connector is removably engaged with fourth connector 50. In some examples, removable engagement indicates engagement between two connectors, e.g., first connector 12 and second connector 14, that can be unmade and remade without substantial mechanical or electrical damage to either connector 12, 14. As shown in FIG. 3, when first connector 12 and second connector 14 are engaged with each other, magnetic data storage device 24 is brought within relatively close proximity to permanent magnet 34. As used herein, the term "relatively close proximity" may refer to a distance at which the magnetic field generated by the permanent magnet is sufficient to effect modification of the data stored in the magnetic data storage device when the magnetic data storage device is moved within the magnetic field. For example, magnetic data storage device 24 may be in relatively close proximity to permanent magnet 34 when device 24 is less than approximately 0.125 inch from magnet 34.

Figure 4:
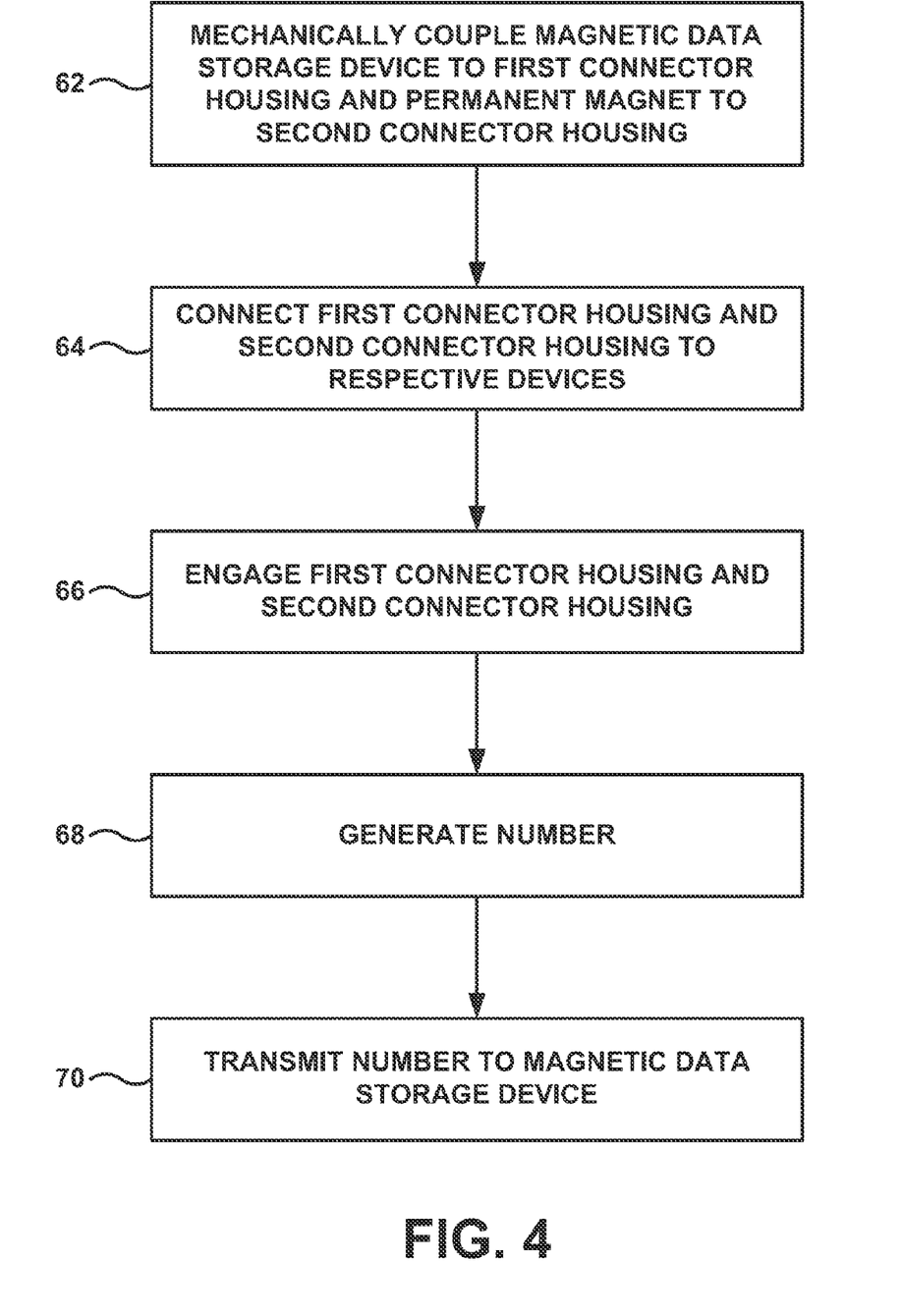
FIG. 4 is a flow diagram that illustrates an example of a technique according to which data can be written to a magnetic data storage device enclosed in a first connector housing.

FIG. 4 is a flow diagram of an example of a technique by which data may be stored on magnetic data storage device 24 to facilitate detection of relative movement between first connector 12 and second connector 14. The technique shown in FIG. 4 will be described with reference to system 40 shown in FIGS. 2 and 3 for purposes of clarity, although it will be understood that a similar technique may be implemented by other systems.

Initially, magnetic data storage device 24 and permanent magnet 34 may be mechanically coupled to first connector housing 16 and second connector housing 26, respectively (62). In some examples, magnetic data storage device 24 is mechanically coupled to first connector housing 16 by at least introducing magnetic data storage device 24 into cavity 22 (FIG. 1) defined by first connector housing 16. In addition, in some examples, permanent magnet 34 is mechanically coupled to second connector housing 26 by at least introducing permanent magnet 34 into cavity 32 (FIG. 1) defined by second connector housing 26. In some examples, disposing magnetic data storage device 24 in first connector housing 16 may include substantially fully enclosing magnetic data storage device 24 within first cavity 22 and disposing permanent magnet 34 in second connector housing 26 may include substantially fully enclosing permanent magnet 34 within second cavity 32.

As described above, first cavity 22 may be defined in first connector housing 16 during manufacture of first connector housing 16. First cavity 22 may be configured (e.g., sized and geometrically shaped) to accept magnetic data storage device 24, which may be an MRAM device in some examples. In some examples, first connector housing 16 may include a cover or another means to close off first cavity 22 and substantially fully enclose magnetic data storage device 24. Similarly, second connector housing 26 may or may not include a cover or another means to close off second cavity 32 and substantially fully enclose permanent magnet 34. As described above, in some examples, external dimensions and features, such as female electrical receptacles 18 and electrical contacts 20, may conform to a connector standard, such as the VMEbus connector standard, a VME64 bus connector standard, an Arinc 404 connector standard, or the like.

In some examples, as part of disposing magnetic data storage device 24 in first connector housing 16 (62), at least one electrical connection of magnetic data storage device 24 may be electrically coupled to at least one of female electrical receptacles 18 and/or at least one of electrical contacts 20. The at least one electrical connection of magnetic data storage device 24 may be, for example, an electrically conductive lead, a bond pad, or the like. By electrically coupling magnetic data storage device 24 to at least one of female electrical receptacles 18 and/or at least one of electrical contacts 20, electrical connection may be made between integrated circuit 54 and magnetic data storage device 24 and/or between an electronic component electrically connected to MIB 44 and magnetic data storage device 24. In this way, integrated circuit 54 and/or another electronic component may transmit instructions to and/or retrieve data stored by magnetic data storage device 24 via the at least one electrical connection between magnetic data storage device 24 and at least one of female electrical receptacles 18 and/or at least one of electrical contacts 20.

Once magnetic data storage device 24 is disposed in first connector housing 16 and permanent magnet 34 is disposed in second connector housing 26, first connector housing 16 may be connected to a first device and second connector housing 26 may be connected to a second device (64). In some examples, the first device to which the first connector housing is connected may include PBA 42 and the second device to which the second connector housing 26 is connected may include MIB 44. First connector housing 16 may be both mechanically and electrically coupled to PBA 42 (e.g., to PB 46). For example, at least one of electrical contacts 20 may be electrically connected to a respective one of at least one electrically conductive portion of PB 46, such as, for example, an electrically conductive pad or electrically conductive via of PB 46. In some examples, respective electrical contacts 20 may be soldered, welded, or brazed to respective electrically conductive portions of PB 46, and the soldering, welding or brazing may provide both mechanical and electrical connection between PB 46 and first connector housing 16. Additionally or alternatively, first connector housing 16 may be mechanically connected to PB 46 using at least one mechanical mechanism, such as, for example, adhesive, friction-fit clips, or another suitable mechanical securing mechanism.

In some examples, the mechanical and electrical connection between first connector housing 16 and PB 46 may be substantially permanent. As described above, a substantially permanent connection may indicate a connection in which the connector objects cannot be disconnected without substantially physically damaging at least one of objects (e.g., first connector 12 or PB 46) or adversely affecting the performance of at least one of the objects.

Second connector housing 26 may be connected to MIB 44 in a similar manner. For example, at least one of electrical contacts 30 of second connector housing 26 may be electrically connected to a respective one of at least one electrically conductive portion of MIB 44, such as, for example, an electrically conductive pad or electrically conductive via of MIB 44. In some examples, respective electrical contacts 30 may be soldered, welded, or brazed to respective electrically conductive portions of MIB 44, and the soldering, welding, or brazing may provide both mechanical and electrical connection between MIB 44 and second connector housing 26. Additionally or alternatively, second connector housing 26 may be mechanically connected to MIB 44 using at least one mechanical mechanism, such as, for example, adhesive, friction-fit clips, or another suitable mechanical securing mechanism.

In some examples, second connector housing 26 may be substantially permanently connected to MIB 44.

In other examples, first connector housing 16 may be mechanically coupled to MIB 44 instead of PB 46 and second connector housing 16 may be mechanically coupled to PB 46 instead of MIB 44.

After connecting the connector housings 16, 26 to the respective devices, first connector housing 16 may be removably engaged with second connector housing 26 to mechanically and electrically couple PBA 42 and MIB 44 (66). Additionally, engaging first connector housing 16 and second connector housing 26 may bring magnetic data storage device 24 within relatively close proximity of permanent magnet 34. As described above, relatively close proximity may refer to a distance at which the magnetic field generated by permanent magnet 34 is sufficient to effect modification of the data stored in the magnetic data storage device 24 when the magnetic data storage device 24 is moved within the magnetic field.

Once magnetic data storage device 24 has been positioned in relatively close proximity to permanent magnet 34, a device generates a number (68) and transmits the number to magnetic data storage device 24 to be stored (70). In some examples, the device that generates the number may be integrated circuit 54 or another electronic component 52 connected to PB 46. In other examples, the device that generates the number may be a device that is external to system 40, such as a device that loads firmware and/or software into memory of system 40 (e.g., into memory devices connected to PC 46 and/or MIB 44) during manufacture of system 40.

In some examples, the device may generate a random or pseudo-random number. For example, the device may execute a series of instructions that cause the device to generate a pseudo-random number based on a set of rules or decision paths that lead to the number including pseudo-random digits. In other examples, the device may generate a predetermined number, e.g., may select a number from a database of pre-generated numbers.

In some examples, the number may be represented by a series or sequence of bits (e.g., a series or sequence of ones and zeros), while in other examples, the number may be represent by digits of any other number system (e.g., base-10, hexadecimal, or the like).

In some examples, when the device transmits the number to magnetic data storage device 24 to be stored (70), the device also transmits the number to a memory device connected to PB 46 to be stored. As described below, in some examples, integrated circuit 54 may execute instructions that cause integrated circuit 54 to retrieve the number stored by magnetic data storage device 24 and to compare the number retrieved from magnetic data storage device 24 to the number stored in the memory device attached to PB 46 to determine if the number stored by magnetic data storage device 24 has been modified after being written to storage device 24. In other examples, the number may not be transmitted to a memory device connected to PB 46 to be stored, and integrated circuit 54 may determine whether the number stored in magnetic data storage device 24 has been modified after being written to storage device 24.

Figure 5:
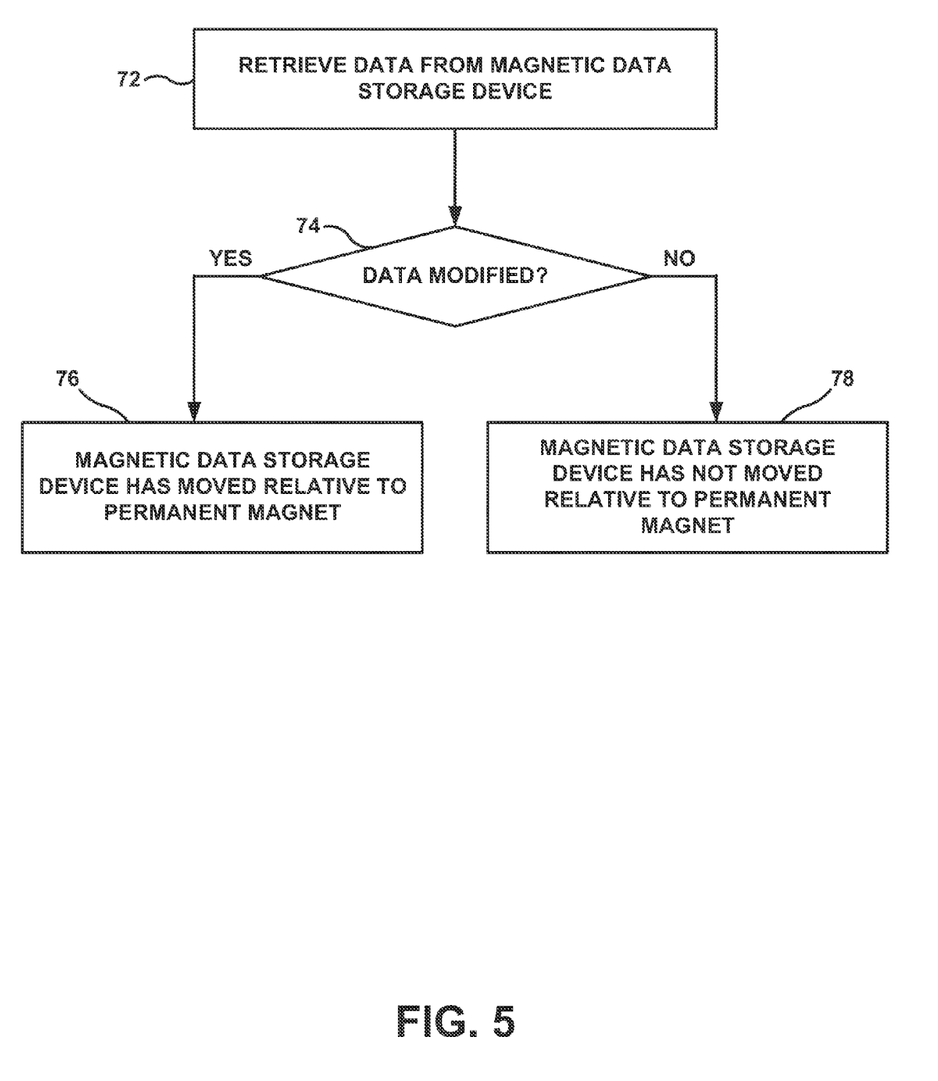
FIG. 5 is a flow diagram that illustrates an example of a technique according to which an integrated circuit may determine whether a first connector housing that encloses a magnetic data storage device has been moved relative to a second connector housing that encloses a permanent magnet.

FIG. 5 is a flow diagram that illustrates an example of a technique that integrated circuit 54 may implement to determine whether magnetic data storage device 24 has moved relative to permanent magnet 34 after data has been written to storage device 24. Initially, integrated circuit 54 may retrieve data stored by from magnetic data storage device (72). In some examples, the data may include or consist of a number. The number may be represented by a series or sequence of bits in some examples. As described above, when originally stored to magnetic data storage device 24, the number may be a predetermined number, a randomly generated number, or a pseudo-randomly generated number.

Integrated circuit 54 then determines whether the data retrieved from magnetic data storage device 24 has been modified subsequent to the writing of the data to storage device 24 (74). As described above, in some examples, the data includes a number. When the data has not been modified after being written to magnetic data storage device 24, the data retrieved from storage device may include the number or may consist of the number.

However, when the data has been modified after being written to magnetic data storage device 24, the data then may include a series or sequence of identical digits (e.g., bits having substantially same values) in some examples. For example, when the data is stored as a series or sequence bits, the data, when modified, may include or consist of a series or sequence of all zeros or all ones. As described above, modification of the data stored by magnetic data storage device 24 may occur when magnetic data storage device 24 is moved relative to permanent magnet 34, within the magnetic field generated by magnet 34. Magnetic flux through magnetic data storage device 24 due to the relative movement between device 24 and magnet 34 may cause the magnetic domains that store data in device 24 to orient to substantially a single direction, which may represent a single digit value (e.g., a one or a zero in a binary number system). Thus, based whether the data includes the originally-stored number or a number including substantially identical digits, integrated circuit 54 may determine whether the data written to magnetic data storage device 24 has been subsequently modified.

In some examples, integrated circuit 54 may compare the data retrieved from magnetic data storage device 24 to data stored on a memory device attached to PB 46. The data stored on the memory device attached to PB 46 may include the data that was originally written to storage device 24. For example, as described above, the device that generates the data that was written to magnetic data storage device 24 also may have caused the data to be stored in the memory device attached to PB 46 when the data was first written to magnetic data storage device 24. In some examples in which the data includes a number, integrated circuit 54 may compare the data retrieved from magnetic data storage device to the data stored in the memory device attached to PB 46 digit-by-digit (or bit-by-bit) to determine whether the data is the same (e.g., substantially matches). In other examples, integrated circuit 54 may additionally or alternatively determine a checksum to determine if the data retrieved from magnetic data storage device 24 has been modified.

In other examples, integrated circuit 54 may implement a cryptographic algorithm that determines whether the data retrieved from magnetic data storage device 24 is the same as the data originally written to storage device 24 or has been modified.

When integrated circuit 54 determines that the data has been modified (the "YES" branch of decision box 74), e.g., the data includes a series of substantially identical digits, integrated circuit 54 determines that magnetic data storage device 24 has moved relative to permanent magnet 34 subsequent to writing of the data to storage device 24 (76). Although not shown in FIG. 5, in some examples, integrated circuit 54 then may take measures to prevent access to data stored in memory devices that form part of PBA 42. For example, integrated circuit 54 may erase data stored in the memory devices coupled to PB 46, may erase or modify a decryption key that allows access to data stored in the memory devices, may restrict user privileges such that the data stored in the memory devices is inaccessible, or may otherwise render the data stored in the memory devices inaccessible to a user. In other examples, integrated circuit 54 may generate and store an indication that PBA 42 has been moved relative to MIB 44 (e.g., that PBA 42 has been tampered with).

On the other hand, if integrated circuit 54 determines that the data stored in magnetic data storage device 24 has not been modified subsequent to being stored in storage device 24 (the "NO" branch of decision block 74), integrated circuit 54 may determine that PBA 42 has not been moved relative to MIB 44 (e.g., that PBA 42 has not been tampered with). When integrated circuit 54 determines that PBA 42 has not been moved relative to MIB 44, integrated circuit 54 may allow access to data stored on memory devices that form part of PBA 42. In this way integrated circuit 54 may in some examples condition access to data stored on memory devices that form part of PBA 42 based on whether PBA 42 has been moved relative to MIB 44.

While the foregoing disclosure has been primarily directed to examples in which magnetic data storage device 24 is placed in relatively close proximity to permanent magnet 34 prior to having data written to magnetic data storage device 24, in other examples, magnetic data storage device 24 may be positioned outside of the magnetic field generated by permanent magnet 34 while data is written to device 24. In such examples, magnetic data storage device 24 may be positioned relative to permanent magnet 34 so that when PBA 42 is removed from MIB 44, magnetic data storage device 24 will pass through the magnetic field generated by permanent magnet 34 and any data stored on magnetic data storage device 24 will be modified.

Various examples of the disclosure have been described. These and other examples are within the scope of the following claims.

The invention claimed is:

1. A system comprising:
   a first connector housing;
   a magnetic data storage device mechanically coupled to the first connector housing;
   a second connector housing configured to be mechanically engaged with the first connector housing; and
   a permanent magnet mechanically coupled to the second connector housing, wherein relative motion between the magnetic data storage device and the permanent magnet causes data stored on the magnetic data storage device to be modified.

2. The system of claim 1, further comprising:
   a printed board assembly, wherein the first connector housing is mechanically and electrically coupled to the printed board assembly; and
   a master interconnect board, wherein the second connector housing is mechanically and electrically coupled to the master interconnect board.

3. The system of claim 2, further comprising an integrated circuit coupled to the printed board assembly, wherein the integrated circuit accesses the data stored on the magnetic data storage device, and determines, based on the data, whether the first connector housing has been moved relative to the second connector housing.

4. The system of claim 3, wherein the integrated circuit conditions access to data stored in a memory coupled to the printed board assembly based on the determination of whether the first connector housing has been moved relative to the second connector housing.

5. The system of claim 1, wherein the magnetic data storage device comprises a magnetic random access memory (MRAM) device.

6. The system of claim 1, wherein the magnetic data storage device stores a sequence of bits that were randomly or pseudo-randomly generated, and wherein relative motion between the magnetic data storage device and the permanent magnet causes the sequence of bits to be changed to a same value.

7. The system of claim 1, wherein the first connector housing conforms to at least one of a VERSAmodule Eurocard (VME) connector standard or an ARINC 404 connector standard, and wherein the second connector housing conforms to at least one of the VERSAmodule Eurocard (VME) connector standard or the ARINC 404 connector standard.

8. The system of claim 1, wherein the first connector housing defines a first cavity and the magnetic data storage device is disposed in the first cavity, and the second connector housing defines a second cavity and the permanent magnet is disposed within the second cavity.

9. The system of claim 8, wherein the first connector housing substantially fully encloses the magnetic data storage device within the first cavity, and wherein the second connector housing substantially fully encloses the permanent magnet within the second cavity.

10. A method comprising:
    mechanically engaging a first connector housing and a second connector housing, wherein mechanically engaging the first connector housing and the second connector housing brings a magnetic data storage device mechanically coupled to the first connector housing within a magnetic field generated by a permanent magnet mechanically coupled to the second connector housing;
    generating a random or pseudo-random number; and
    writing the random or pseudo-random number to the magnetic data storage device while the magnetic data storage device is within the magnetic field.

11. The method of claim 10, wherein the first connector housing is electrically and mechanically coupled to a printed board assembly, wherein the second connector housing is electrically and mechanically coupled to a master interconnect board, and wherein mechanically engaging the first connector housing and the second connector housing comprises mechanically and electrically coupling the printed board assembly and the master interconnect board via the first connector housing and the second connector housing.

12. The method of claim 10, wherein the first connector housing defines a first cavity and the magnetic data storage device is disposed in the first cavity, and the second connector housing defines a second cavity and the permanent magnet is disposed within the second cavity.

13. A method comprising:
retrieving data with an integrated circuit from a magnetic data storage device mechanically coupled to a first connector housing; and
determining with the integrated circuit and based on the data, whether the magnetic data storage device has been moved relative to a magnetic field generated by a permanent magnet mechanically coupled to a second connector housing after the data was written to the magnetic data storage device, wherein the second connector housing is configured to be mechanically engaged with the first connector housing, and wherein relative motion between the magnetic data storage device and the permanent magnet causes data stored on the magnetic data storage device to be modified.

14. The method of claim 13, wherein determining, with the integrated circuit and based on the data, whether the magnetic data storage device has been moved relative to the magnetic field after the data was written to the magnetic data storage device comprises:
determining whether the data has a series of bits having a same value; and
determining that the magnetic data storage device has been moved relative to the magnetic field after the data was written to the magnetic data storage device if the data has the series of bits having the same value.

15. The method of claim 13, wherein determining, with the integrated circuit and based on the data, whether the magnetic data storage device has been moved relative to the magnetic field after the data was written to the magnetic data storage device comprises:
determining whether the data includes a series of randomly or pseudo-randomly generated series of bits; and
determining that the magnetic data storage device has been moved relative to the magnetic field after the data was written to the magnetic data storage device if the data has the series of randomly or pseudo-randomly generated series of bits.

16. The method of claim 13, wherein determining, with the integrated circuit and based on the data, whether the magnetic data storage device has been moved relative to the magnetic field after the data was written to the magnetic data storage device comprises analyzing the data using a cryptographic algorithm.

17. The method of claim 13, wherein determining, with the integrated circuit and based on the data, whether the magnetic data storage device has been moved relative to the magnetic field after the data was written to the magnetic data storage device comprises comparing the data to a series of bits that are substantially the same as data originally written to the magnetic data storage device.

18. The method of claim 13, wherein the first connector housing is mechanically and electrically coupled to a printed board assembly, wherein the integrated circuit is mechanically and electrically coupled to the printed board assembly, and wherein the second connector housing is mechanically and electrically coupled to a master interconnect board.

19. The method of claim 13, further comprising conditioning access to information stored in a memory coupled to the printed board assembly based on the determination of whether the magnetic data storage device has been moved relative to the permanent magnet.

20. The method of claim 13, wherein the magnetic data storage device is substantially fully enclosed in the first connector housing and the permanent magnet is substantially fully enclosed in the second connector housing.

* * * * *